US010019827B2

(12) United States Patent
Selle et al.

(10) Patent No.: US 10,019,827 B2
(45) Date of Patent: Jul. 10, 2018

(54) MATERIAL POINT METHOD FOR SIMULATION OF GRANULAR MATERIALS

(71) Applicant: Disney Enterprises, Inc., Burbank, CA (US)

(72) Inventors: Andrew Selle, Burbank, CA (US); Lawrence Chai, Burbank, CA (US); Alexey Stomakhin, Burbank, CA (US); Joseph Teran, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 832 days.

(21) Appl. No.: 14/257,044

(22) Filed: Apr. 21, 2014

(65) Prior Publication Data

US 2015/0187116 A1 Jul. 2, 2015

Related U.S. Application Data

(60) Provisional application No. 61/922,602, filed on Dec. 31, 2013.

(51) Int. Cl.
*G06T 13/60* (2011.01)
*G06F 17/50* (2006.01)

(52) U.S. Cl.
CPC .......... *G06T 13/60* (2013.01); *G06F 17/5009* (2013.01); *G06F 2217/16* (2013.01); *G06T 2210/56* (2013.01)

(58) Field of Classification Search
CPC ......... G06T 13/00; G06T 13/20; G06T 13/60; G06T 13/80; G06T 19/00; G06T 2210/24;
(Continued)

(56) References Cited

U.S. PATENT DOCUMENTS 6,456,289 B1\* 9/2002 O'Brien .................. G06T 13/20
345/473
6,456,293 B1\* 9/2002 Grandy .................... H04N 1/60
345/590

(Continued)

OTHER PUBLICATIONS

Andersen, Søren, and Lars Andersen. "Modelling of landslides with the material-point method." Computational Geosciences 14.1 (2010): 137-147.\*

(Continued)

*Primary Examiner* — Sae Won Yoon
(74) *Attorney, Agent, or Firm* — Patterson + Sheridan, LLP

(57) ABSTRACT

The disclosure provides an approach for simulating and rendering granular materials. A simulation application generates video frames depicting a granular material phenomenon using a strain based elasto-plastic constitutive model integrated with a hybrid Eulerian/Lagrangian material point method (MPM). The elasto-plastic constitutive model includes physical equation(s) which dictate forces that affect the granular material during the simulation. In particular, the constitutive model may include user-controllable parameters defining threshold(s) to start plastic deformation, as well as a hardening parameter which controls how fast the granular material packs under compression. The MPM is a procedure in which particles of the granular material and a background grid are coupled, with the grid being used to assist in computing forces dictated by the physical equation(s) of the elasto-plastic constitutive model. In one configuration, the grid may further be rendered with volumetric rendering to generate video frames depicting the granular material.

18 Claims, 4 Drawing Sheets

(58) Field of Classification Search
CPC ......... G06T 2210/56; G06T 2219/2021; G06F 17/5009
USPC ...................................................... 345/419
See application file for complete search history.

(56) References Cited

U.S. PATENT DOCUMENTS

| | | | | |
|---|---|---|---|---|
| 7,373,284 | B2* | 5/2008 | Stabelfeldt | G06F 17/5018 345/419 |
| 8,204,725 | B1 | 6/2012 | Thuerey et al. | |
| 8,970,592 | B1* | 3/2015 | Petterson | G06T 13/60 345/419 |
| 9,285,293 | B2* | 3/2016 | Seta | G01M 17/027 |
| 2010/0049489 | A1* | 2/2010 | Tanaka | G06F 17/5018 703/9 |
| 2010/0277475 | A1* | 11/2010 | McAdams | G06T 13/40 345/420 |
| 2010/0292965 | A1 | 11/2010 | Yilbas et al. | |
| 2012/0053908 | A1 | 3/2012 | Kim et al. | |
| 2012/0095741 | A1* | 4/2012 | Jin | E21B 43/025 703/9 |
| 2012/0253756 | A1* | 10/2012 | Favier | G06F 17/5009 703/2 |
| 2013/0127874 | A1* | 5/2013 | Peterson | G06T 13/80 345/473 |
| 2014/0214377 | A1 | 7/2014 | Kazama | |
| 2014/0226884 | A1* | 8/2014 | Porikli | A61N 5/1037 382/131 |
| 2014/0309971 | A1 | 10/2014 | Ueno | |
| 2015/0161305 | A1 | 6/2015 | Kazama | |
| 2015/0213163 | A1* | 7/2015 | Yang | G06F 17/10 703/2 |

OTHER PUBLICATIONS

Yao, Yang-Ping, Haruyuki Yamamoto, and Nai-Dong Wang. "Constitutive model considering sand crushing." Soils and foundations 48.4 (2008): 603-608.*
O'brien, James F., and Jessica K. Hodgins. "Graphical modeling and animation of brittle fracture." Proceedings of the 26th annual conference on Computer graphics and interactive techniques. ACM Press/Addison-Wesley Publishing Co., 1999.*
El Youssoufi, Moulay Saïd, J-Y. Delenne, and Farhang Radjai. "Self-stresses and crack formation by particle swelling in cohesive granular media." Physical Review E 71.5 (2005): 051307.*
McDowell, G. R., M. D. Bolton, and D. Robertson. "The fractal crushing of granular materials." Journal of the Mechanics and Physics of Solids 44.12 (1996): 2079-2101.*
Seta, E., T. Kamegawa, and Y. Nakajima. "Prediction of snow/tire interaction using explicit FEM and FVM." Tire Science and Technology 31.3 (2003): 173-188.*
Chanclou, Benoit, Annie Luciani, and Arash Habibi. "Physical models of loose soils dynamically marked by a moving object." Computer Animation'96. Proceedings. IEEE, 1996.*
Contrafatto, Loredana, and Massimo Cuomo. "Comparison of two forms of strain decomposition in an elastic-plastic damaging model for concrete." Modelling and Simulation in Materials Science and Engineering 15.4 (2007): S405.*
Svendsen, Bob, et al. "Hyperelastic models for elastoplasticity with non-linear isotropic and kinematic hardening at large deformation." International journal of solids and structures 35.25 (1998): 3363-3389.*
Aldu 'An, I., and Otaduy, M. 2011. SPH granular flow with friction and cohesion. In Proc. of the 2011 ACM SIGGRPH/Eurographics Symp. on Comp. Anim., 25-32.
Aldu 'An, I., Tena, A., and Otaduy, M. 2009. Simulation of high-resolution granular media. In Proc. of Congreso Espanol de Inform 'atica Gr'afica, vol. 1.
Bargteil, A., Wojtan, C., Hodgins, J., and Turk, G. 2007. A finite element method for animating large viscoplastic flow. In ACM Trans. on Graph., vol. 26, 16.

Bell, N., Yu, Y., and Mucha, P. 2005. Particle-based simulation of granular materials. In Proc. of the 2005 ACM SIGGRAPH/Eurographics symposium on Comp. animation, 77-86.
Brown, R. 1980. A volumetric constitutive law for snow based on a neck growth model. J. of Appl. Phys. 51, 1, 161-165.
Chanclou, B., Luciani, A., and Habibi, A. 1996. Physical models of loose soils dynamically marked by a moving object. In Comp. Anim.'96. Proc., 27-35.
Chao, I., Pinkall, U., Sanan, P., and Schr Oder, P. 2010. A simple geometric model for elastic deformations. ACM Trans. on Graph. 29, 4, 38.
Cresseri, S., and Jommi, C. 2005. Snow as an elastic viscoplastic bonded continuum: a modelling approach. Italian Geotechnical J. 4, 43-58.
Cresseri, S., Genna, F., and Jommi, C. 2010. Numerical integration of an elastic-viscoplastic constitutive model for dry metamorphosed snow. Intl. J. for Num. and Anal. Meth. in geomechanics 34, 12, 1271-1296.
Dutykh, D., Acary-Robert, C., and Bresch, D. 2011. Mathematical modeling of powder-snow avalanche flows. Studies in Appl. Math. 127, 1, 38-66.
Fearing, P. 2000. Computer modelling of fallen snow. In Proc. of the 27th annual conf. on Comp. Graph. and interactive techniques, 37-46.
Feldman, B., and O'Brien, J. 2002. Modeling the accumulation of wind-driven snow. In ACM SIGGRPH 2002 conf. abstracts and applications, 218-218.
Goktekin, T., Bargteil, A., and O'Brien, J. 2004. A method for animating viscoelastic fluids. In ACM Trans. On Graph., vol. 23, 463-468.
Gray, D., and Male, D. 1981. Handbook of snow: principles, processes, management & use. Pergamon Press.
Ihmsen, M., Wahl, A., and Teschner, M. 2012. Highresolution simulation of granular material with SPH. In Workshop on Virtual Reality Interaction and Phys. Sim., 53-60.
Irving, G., Teran, J., and Fedkiw, R. 2004. Invertible finite elements for robust simulation of large deformation. In Proc. of the 2004 ACM SIGGRAPH/Eurographics symposium on Comp. animation, 131-140.
Keiser, R., Adams, B., Gasser, D., Bazzi, P., Dutr'e, P., and Gross, M. 2005. A unified lagrangian approach to solid-fluid animation. In Point-Based Graph., 2005. Eurographics/IEEE VGTC Symp. Proc., 125-148.
Kim, T., and Lin, M. 2003. Visual simulation of ice crystal growth. In Proc 2003 ACM SIGGRAPH/Eurographics Symp. Comput. Anim., 86-97.
Kim, T., Adalsteinsson, D., and Lin, M. 2006. Modeling ice dynamics as a thin-film Stefan problem. In Proc. 2006 ACM SIGGRAPH/Eurographics Symp. Comput. Anim., 167-176.
Luciani, A., Habibi, A., and Manzotti, E. 1995. A multiscale physical model of granular materials. In Graphics Interface, 136-136.
Marechal, N., Guerin, E., Galin, E., Merillou, S., and Merillou, N. 2010. Heat transfer simulation for modeling realistic winter sceneries. Comp. Graph. Forum 29, 2, 449-458.
McAdams, A., Selle, A., Ward, K., Sifakis, E., and Teran, J. 2009. Detail preserving continuum simulation of straight hair. ACM Trans. on Graphics 28, 3, 62.
Meschke, G., Liu, C., and Mang, H. 1996. Large strain finite-element analysis of snow. J. of Engng. Mech. 122, 7, 591-602.
Milenkovic, V. 1996. Position-based physics: simulating the motion of many highly interacting spheres and polyhedra. In Proc. of the 23rd annual conf. on Comp. Graph. and interactive techniques, 129-136.
Miller, G., and Pearce, A. 1989. Globular dynamics: A connected particle system for animating viscous fluids. Comp. & Graph. 13, 3, 305-309.
Narain, R., Golas, A., and Lin, M. 2010. Free-flowing granular materials with two-way solid coupling. In ACM Trans. On Graph., vol. 29, 173.
Nicot, F. 2004. Constitutive modelling of snow as a cohesive-granular material. Granular Matter 6, 1, 47-60.

(56) References Cited

OTHER PUBLICATIONS

Nishita, T., Iwasaki, H., Dobashi, Y., and Nakamae, E. 1997. A modeling and rendering method for snow by using metaballs. In Comp. Graph. Forum, vol. 16, C357-C364.

O'Brien, J., Bargteil, A., and Hodgins, J. 2002. Graphical modeling and animation of ductile fracute. ACM Trans. On Graph. 21, 3, 291-294.

Pauly, M., Keiser, R., Adams, B., Dutr'e, P., Gross, M., and Guibas, L. 2005. Meshless animation of fracturing solids. In ACM Trans. on Graph., vol. 24, 957-964.

Pla-Castells, M., Garc'ia-Fern 'Andez, I., and Mart'inez, R. 2006. Interactive terrain simulation and force distribution models in sand piles. Cellular Automata, 392-401.

St Lawrence, W., and Bradley, C. 1975. The deformation of snow in terms of structural mechanism. In Snow Mech. Symp., 155.

Stomakhin, A., Howes, R., Schroeder, C., and Teran, J. 2012. Energetically consistent invertible elasticity. In Eurographics/ACM SIGGRAPH Symp. on Comp. Anim., 25-32.

Sumner, R., O'Brien, J., and Hodgins, J. 1999. Animating sand, mud, and snow. In Comp. Graph. Forum, vol. 18, 17-26.

Terzopoulos, D., and Fleischer, W. 1988. Modeling inelastic deformation: viscoelasticity, plasticity, fracture. Proc. ACM SIGGRAPH 1988 22, 4, 269-278.

Wojtan, C., and Turk, G. 2008. Fast viscoelastic behavior with thin features. In ACM Trans. on Graph., vol. 27, 47.

Zhu, Y., and Bridson, R. 2005. Animating sand as a fluid. ACM Trans. on Graph. 24, 3, 965-972.

Zhu, B., and Yang, X. 2010. Animating sand as a surface flow. Eurographics 2010, Short Papers.

Barbara Solenthaler et al., A unified particle model for fluid-solid interactions, Wiley InterScience, Comp. Anim. Virtual Worlds 2007; 18: 69-82.

P.C. Wallstedt et al., An evaluation of explicit time integration schemes for use with the generalized interpolation material point method, Elsevier Ltd, Journal of Computational Physics 227 (2008) 9628-9642.

* cited by examiner

MATERIAL POINT METHOD FOR SIMULATION OF GRANULAR MATERIALS

CROSS-REFERENCE TO RELATED APPLICATIONS

This application claims benefit of U.S. provisional patent application Ser. No. 61/922,602, filed Dec. 31, 2013, which is herein incorporated by reference in its entirety.

BACKGROUND

Field

This disclosure provides techniques for simulating and rendering granular materials. More specifically, aspects of this disclosure present a material point method for simulation of granular materials.

Description of the Related Art

In physics engines, "solvers" are used to simulate physical behavior of objects (e.g., the physical response of an object to a collision with another object). These solvers typically employ numerical techniques to approximate the physics so that simulations can be efficiently performed on a computer. Specialized solvers have been used to simulate a variety of phenomena in graphics and computational physics. Such solvers include fluid simulators, rigid body simulators, and cloth simulators, among others, each of which is suited to simulating behavior of a particular type of material. For example, fluid simulators are suited for simulating liquids which deform with no memory, while rigid body simulators are suited for simulating destruction and debris where there is no deformation (e.g., glass shattering). When solids and fluids are needed simultaneously, two-way coupled systems have been used to obtain accuracy and performance for both phenomena.

Granular materials (e.g., snow, sand, dust, etc.) can have continuously varying phase effects, i.e., these materials sometimes behave as a rigid/deforming solid and sometimes as a fluid. Traditional solvers and coupled systems are unable to simultaneously handle a continuum of material properties efficiently to simulate the behavior of such granular materials. For example, to simulate snow, artists typically mix various simulation techniques intended for other phenomena. This process can be error-prone, time consuming, and typically does not produce good results.

SUMMARY

One aspect of this disclosure provides a computer implemented method for simulating a granular material. The method generally includes receiving states of particles of the granular material. The method further includes updating the states of the particles by computing, on a grid, forces dictated by a strain based elasto-plastic constitutive model. In addition, the method includes rendering successive images of the granular material based on the updated states of the particles.

Other aspects include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

DETAILED DESCRIPTION

Figure 1:
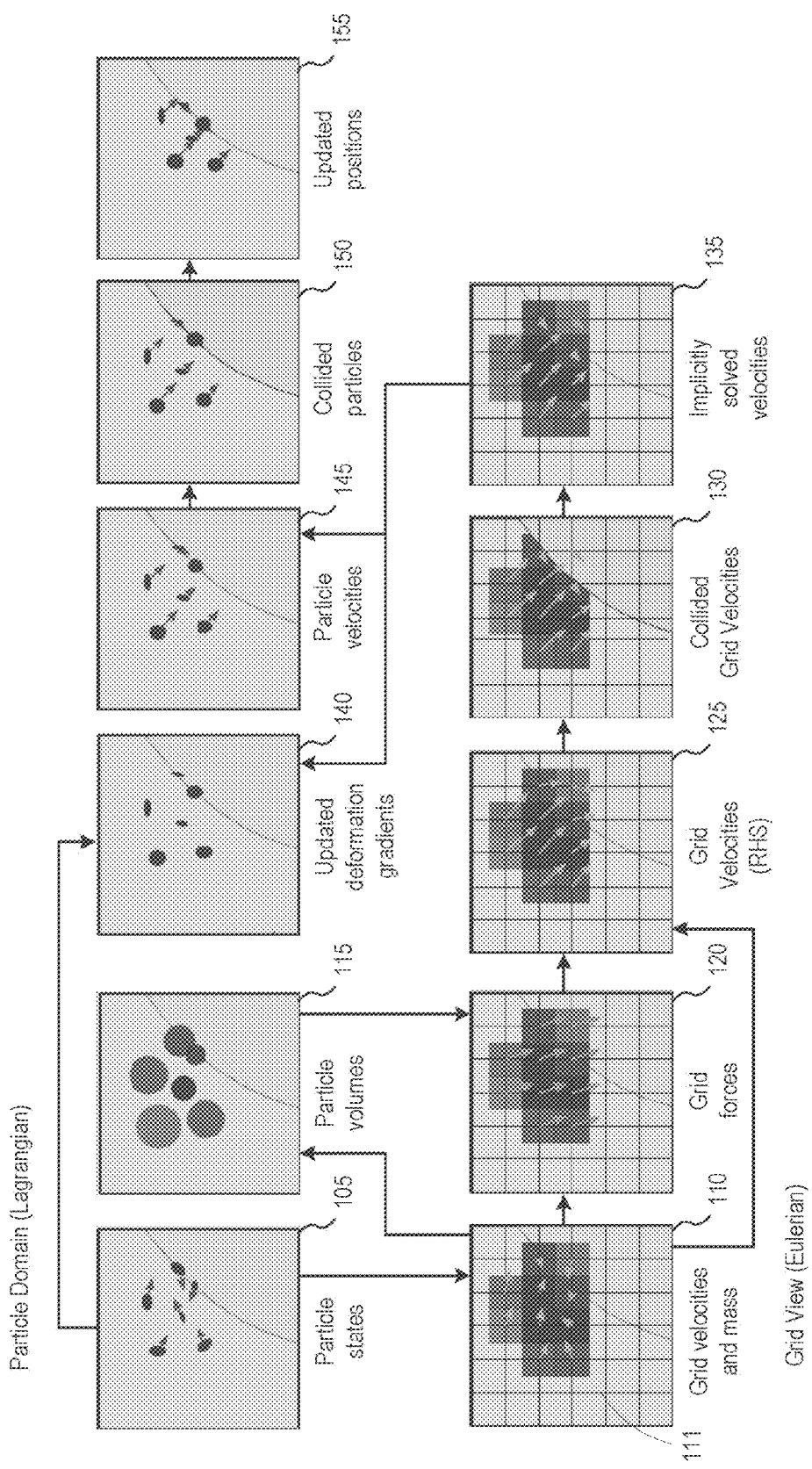
FIG. 1 illustrates a material point method for simulating snow, according to an aspect of this disclosure.

This disclosure provides techniques for simulating granular materials, such as snow. In one configuration, a simulation application generates video frames depicting a granular material phenomenon using a strain based elasto-plastic constitutive model integrated with a hybrid Eulerian/Lagrangian material point method (MPM). The elasto-plastic constitutive model includes physical equations which dictate forces that affect the granular material during the simulation. In one configuration, the elasto-plastic constitutive model allows elasticity to be blended with plasticity for more realistic simulation of granular materials. As used herein, "elasticity" generally refers to tendency of a material to deform under stress but recover its original shape after the removal of the stress. "Plasticity" generally refers to tendency of the material to be permanently deformed by a stress applied to the material even after the stress is removed. This is also referred to as having "memory" of the deformation. Granular materials tend to be "elasto-plastic" in the sense that they (1) can undergo deformation and lose memory of the deformation, but (2) can also be more rigid.

The MPM is a numerical procedure which allows simulations to be performed on a computer, and is particularly suited to simulating elasto-plastic materials such as granular materials. In a MPM simulation of a granular material, particles of the granular material and a background grid are coupled. The grid assists computing forces dictated by the physical equations of the elasto-plastic constitutive model. That is, in order to move particles, forces need to be computed, and the MPM procedure does so by transferring material parameters from the particles to the grid and computing forces on the grid by applying the elasto-plastic constitutive model. The grid permits numerical derivatives to be more easily computed than if only particles are used. At the same time, use of the particles in MPM makes tracking mass and fracture easier, as no mesh connectivity has to be tracked. The MPM procedure also implicitly handles fracture and self-collisions which are typically expensive in, e.g., rigid body simulations. In one configuration, the grid from the MPM procedure may further be rendered with volumetric rendering to generate video frames depicting the granular material. That is, MPM creates a volumetric grid of density as part of the simulation process, and such a grid may be rendered to generate the video frames.

In one configuration, the constitutive model includes user-controllable parameters defining thresholds to start plastic deformation (or fracture), thereby determining when the granular material starts breaking and allowing users to alter the granular material from being, e.g., a chunky material to being a powdery material. Further, the thresholds may be defined in terms of strain, rather than stress. Strain represents an amount of stretch or deformation (applied to the material) and is relatively intuitive for users to understand. In another configuration, the constitutive model may include a hardening parameter used to specify how fast the material breaks once it becomes plastic, i.e., once the thresholds are exceeded. In such a case, the hardening parameter may be defined so that stiffness parameters are increased when the granular material is compressed by a force. In an alternative configuration, the constitutive model may be controlled by a polar coordinate parameterization. Doing so reduces redundancies in the parameter space. In such a case, the parameters may include a plasticity threshold which controls how strong the granular material is, i.e., how much strength is required to break the granular material, as well as a chunkiness parameter which controls the chunk size of the granular material after it breaks and a Poisson's ratio parameter. Experience has shown that these parameters permit users to intuitively control how the granular material behaves during simulation. Thus, users may set parameter values such that the behavior of the simulated granular material resembles that of various types of actual granular materials.

Note, although snow is used herein as a representative example of a granular material, this disclosure is not limited to simulating snow. Techniques disclosed herein may generally be used to simulate and render any granular materials, including sand, dust, and the like.

FIG. 1 illustrates a material point method for simulating snow, according to an aspect of this disclosure. As discussed, the MPM is a numerical computational procedure in which particles of the granular material (e.g., snow) and a background grid are coupled, with the grid being used to assist in computing forces dictated by physical equations of an elasto-plastic constitutive model. The grid permits numerical derivatives to be more easily computed than if only particles are used. At the same time, the particles make tracking mass and fracture easier, as no mesh connectivity has to be tracked. The MPM procedure also implicitly handles fracture and self-collisions which are typically expensive in, e.g., rigid body simulations.

MPM relies on the continuum approximation and avoids the need to model every snow grain. While MPM typically uses a Cartesian grid to make topology changes and self-collisions automatic, MPM tends to outperform purely Eulerian methods which also rely on grids, as MPM tracks mass (and other conserved quantities) through non-dissipative Lagrangian particles. More specifically, MPM uses the grid as an efficient continuum scratch pad, which avoids high valence communication patterns derived from nearest-neighbor queries. Experience has shown that the MPM procedure is particularly well-suited to handle the dynamics of granular particles such as snow. The constitutive properties central to snow include volume preservation, stiffness, plasticity, and fracture. Volume preservation in snow is important even though, unlike a liquid, snow is compressible. Snow has varying resistance to volume change, which may be modeled similarly to a typical mesh-based solid simulation. Stiffness is also important in snow, and while MPM cannot handle stiffness as well as mesh-based elasticity (the deformation gradient is less accurate), it is more effective than grid-based elasticity as the deformation gradient is not dissipative and remains synchronized with positions. Plasticity and fracture are handled well by MPM, which also makes MPM desirable for snow simulation. Note, MPM's gains in plasticity and fracture come at the cost of reduced elastic accuracy, which is a good tradeoff for snow.

More formally, deformation of a body can be described as the mapping $x = \varphi(X)$ from the body's undeformed configuration X to its deformed configuration x, with associated deformation gradient $F = \partial \varphi / \partial X$. Deformation $\varphi(X)$ changes according to conservation of mass, conservation of momentum, and the elasto-plastic constitutive relation $$\frac{D\rho}{Dt} = 0, \rho \frac{Dv}{Dt} = \nabla \cdot \sigma + \rho g, \sigma = \frac{1}{J} \frac{\partial \Psi}{\partial F_E} F_E^T,$$

where $\rho$ is density, t is time, v is velocity, $\sigma$ is the Cauchy stress, $\Psi$ is the elasto-plastic potential energy density, $F_E$ is the elastic part of the deformation gradient F and $j = \det(F)$. As discussed in greater detail below, the elasto-plastic constitutive model in one configuration may be defined in terms of the elasto-plastic energy density function as $$\Psi(F_E, F_P) = \mu(F_P)\|F_E - R_E\|_F^2 + \frac{\lambda(F_P)}{2}(J_E - 1)^2.$$

The MPM uses material particles to track mass, momentum, and deformation gradient. For example, particle p may have position $x_p$, velocity $v_p$, mass $m_p$, and deformation gradient $F_p$. A Lagrangian (particle) treatment of these quantities simplifies discretization of the terms of the constitutive relation $D\rho/Dt$ and $\rho Dv/Dt$, discussed above, for purposes of computer simulation. However, the lack of mesh connectivity between particles in such a Lagrangian treatment complicates the computation of derivatives needed for stress-based force evaluation. The MPM remedies this by using a regular background Eulerian grid. Interpolating functions over such a grid may then be used to discretize the $\nabla \cdot \sigma$ terms in the standard finite element method (FEM) manner using the weak form. In one configuration, the grid basis functions used may be dyadic products of one-dimensional cubic B-splines:

$$N_i^h(x_p) = N\left(\frac{1}{h}(x_p - ih)\right) N \frac{1}{h}\left(\frac{1}{h}(y_p - jh)\right) N\left(\frac{1}{h}(z_p - kh)\right), \quad (1)$$

where $i = (i,j,k)$ is the grid index, $x_p = (x_p, y_p, z_p)$ is the evaluation position, h is the grid spacing and $$N(x) = \begin{cases} \frac{1}{2}|x|^3 - x^2 + \frac{2}{3}, & 0 \le |x| < 1 \\ -\frac{1}{6}|x|^3 + x^2 - 2|x| + \frac{4}{3}, & 1 \le |x| < 2 \\ 0, & \text{otherwise} \end{cases} \quad (2)$$

The more compact notation $w_{ip} = N_i^h(x_p)$ and $\nabla w_{ip} = \nabla N_i^h(x_p)$ will be used herein. These interpolating functions are used to compute forces at the nodes of the Eulerian grid, discussed above. Consequently, in MPM, the simulation application first transfers mass and momentum from the particles to the grid so that the velocities can be updated at grid nodes. Then, the simulation application transfers the updated velocity back to the particles in either a Fluid- Implicit Particle (FLIP) or Particle-in-Cell (PIC) type manner. Such a transfer process may be accomplished using interpolating weights $w_{ip}$.

FIG. 1 depicts steps of the MPM procedure for simulating snow. At 110, the simulation application transfers mass and velocity of snow particles shown in 105 to an Eulerian grid 111. Particles are the primary representation of the snow, and each particle has a position, velocity, and deformation gradient. These particles are rasterized to the grid at 110. At 115, the simulation application computes initial particle volumes and densities at a first timestep. At 120, the simulation application computes grid-based forces using an elasto-plastic constitutive model. At 125, the simulation application updates the grid velocities based on the computed grid forces. Then, at 130, the simulation application further modifies the grid velocities in response to collisions. At 135, the simulation application implicitly solves for velocities using the collided grid velocities as the right-hand-side of the implicit solve. At 140 and 145, the simulation application transitions back to the particles and updates deformation gradients for the particles and particle velocities, respectively, based on the results of the grid computations. At 150, the simulation application computes particle-based body collisions, analogous to the grid collision discussed above. Then, at 155, the simulation application updates particle positions.

Figure 2:
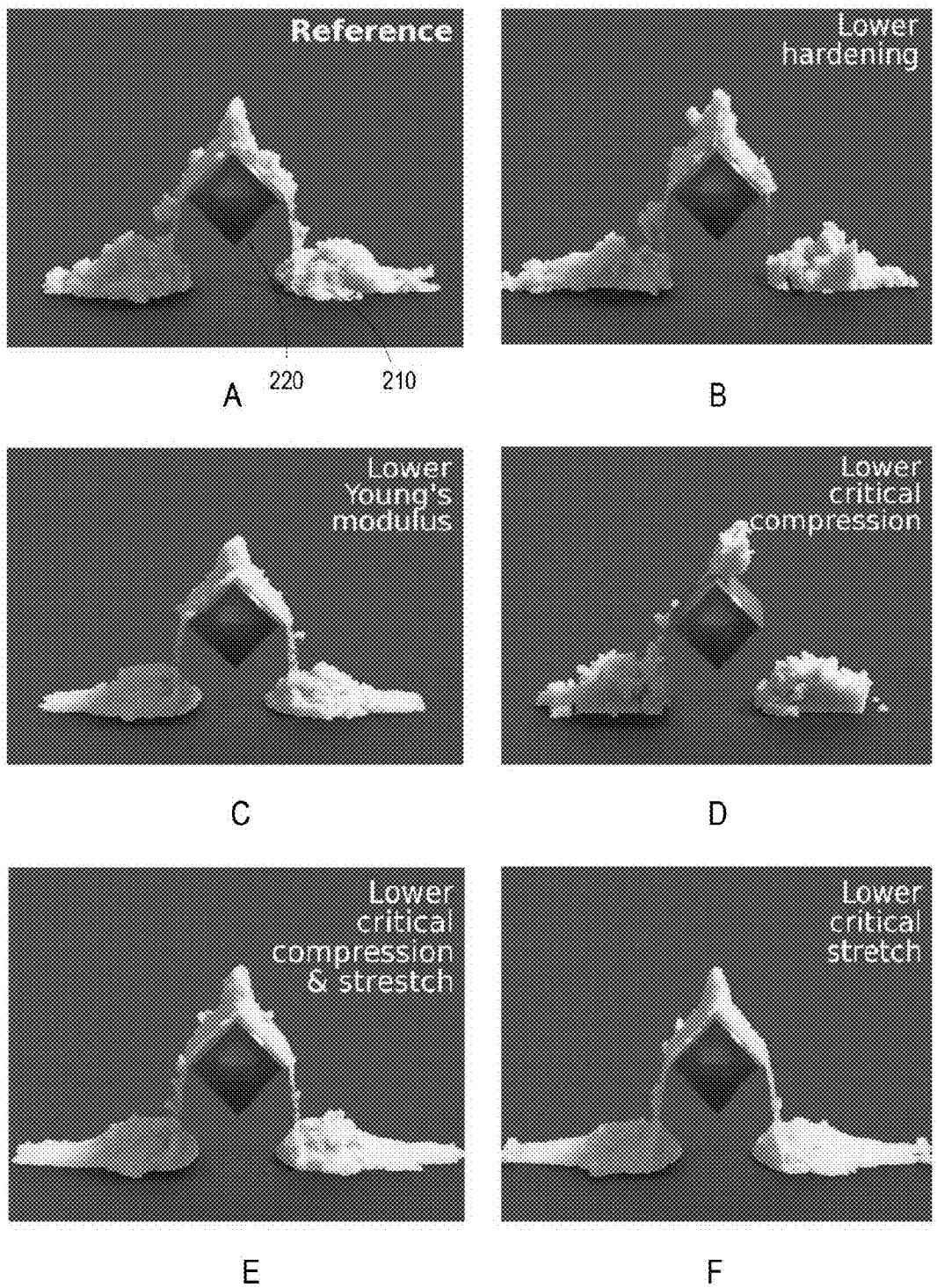
FIG. 2 illustrates changing various parameters in an elasto-plastic constitutive model to affect the appearance and dynamic properties of snow in a simulation, according to an aspect of this disclosure.

FIG. 2 illustrates how changing various parameters in an elasto-plastic constitutive model affects appearance and dynamic properties of snow, according to an aspect of this disclosure. As discussed, the constitutive model may model physical forces and be used in steps 120 and 135 of FIG. 1, which are described in additional detail relative to FIG. 3. In one configuration, the constitutive model may be factored into plastic and elastic strain using finite-strain multiplicative elasticity with the elasticity being hyperelastic (i.e., an elastic energy that only depends on the deformation gradient). That is, the constitutive model models a material which is elastic in the regime of small deformations, but when the deformation exceeds a threshold, the material starts deforming plastically. Such a model may use principal stretches rather than principal stresses in defining the plasticity yield criteria (when the elastic material becomes a plastic material), as well as a simplification of hardening behavior that only requires modification of Lamé parameters in the hyperelastic energy density. Experience has shown that, while principle-stress-based plasticity is more appropriate for physical accuracy, principal-stretch-based yield gives users greater control over the visual behavior of the simulation. In addition, the constitutive model may be a continuum model of the snow at a macroscopic level, as opposed to a model of molecular behavior of the snow.

As discussed, multiplicative plasticity theory separates the deformation gradient F into an elastic part $F_E$ and a plastic part $F_P$ so that $F=F_E F_P$. In one configuration, the constitutive model may be defined in terms of the elasto-plastic energy density function:

$$\Psi(F_E, F_P) = \mu(F_P)\|F_E - R_E\|_F^2 + \frac{\lambda(F_P)}{2}(J_E - 1)^2, \quad (3)$$

with the elastic part given by a fixed corotated energy density, and the Lamé parameters being functions of the plastic deformation gradients $$\mu(F_P) = \mu_0 e^{\xi(1-J_P)} \text{ and } \lambda(F_P) = \lambda_0 e^{\xi(1-J_P)} \quad (4)$$

where $J_E = \det F_E$, $J_P = \det F_P$, $F_E = R_E S_E$ by the polar decomposition, $\lambda_0$ and $\mu_0$ are the initial Lamé coefficients, and $\xi$ is a dimensionless plastic hardening parameter. Note, although the hardening parameter $\xi$ is shown as an exponential factor, the hardening parameter may generally take any form so that stiffness parameters are increased quickly with compression of the snow. Intuitively, this increase of thickness resulting from compression corresponds to the packing effect seen in some granular materials. For example, snow tends to compact (e.g., into a snowball) and become harder under compression, rather than becoming softer under compression as in plastic materials.

The portion of deformation that is elastic and plastic may be defined using the singular values of the deformation gradient. Further, a critical compression $\theta_c$ and a stretch $\theta_s$ parameter may be used as the thresholds to start plastic deformation (or fracture). That is, the singular values of $F_E$ are restricted to the interval $[1-\theta_c, 1+\theta_s]$. Other parameters may include an initial density (kg/m³) parameter $\rho_0$, an initial Young's modulus (Pa) parameter $E_0$ (larger=more packed, smaller=softer), and a Poisson's ratio parameter v (larger=less compressible, smaller=more compressible). In an alternative configuration, the critical compression $\theta_c$ and stretch $\theta_s$ parameters may be reparametrized in polar coordinates to be more intuitive for users to control. Experience has shown that using the critical compression $\theta_c$ and stretch $\theta_s$ parameters directly might not be intuitive in how they affect the final look of the simulated substance (e.g. snow), so using some combination of the parameters may be more convenient from this perspective. In one embodiment, the critical compression $\theta_c$ and stretch $\theta_s$ parameters may be reparametrized in polar coordinates to produce new parameters corresponding to rotation and range in the polar coordinates. One such new parameter may be a strength parameter that controls how strong the snow is, i.e., how much strength it takes to break the snow. Another new parameter may control the chunk size of the snow, i.e., the size of the chunks of snow once the snow breaks. The polar coordinate parameterization may also depend on a Poisson's ratio parameter. In a particular embodiment, the parameters in the polar coordinate parameterization may include plasticity threshold parameter r which can be used to control wetness of snow, chunkiness parameter $\alpha$ which can be used to control shattering of snow chunks, and Poisson's ratio parameter v which can be used to control granularity of the snow. These parameters may be related to the original critical compression $\theta_c$ and stretch $\theta_s$ parameters as follows:

$$\theta_s = vr\sin\left(\frac{\pi\alpha}{2}\right)\sqrt{2}, \; \theta_c = v\cos\left(\frac{\pi\alpha}{2}\right)\sqrt{2}.$$

According to the constitutive model just discussed, the snow is elastic in the regime of small deformations as dictated by the $F_E$ dependence in equation (3). When the deformation exceeds either the stretch $\theta_s$ or the compression $\theta_c$ threshold, then the material starts deforming plastically, as discussed in greater detail below. Exceeding either threshold also affects the material properties in accordance with equation (4), making it stronger under compression (packing) and weaker under stretch (fracture).

To simulate different types of granular material (e.g., different types of snow), experience has shown that the following heuristics are useful. The critical stretch $\theta_s$ and compression $\theta_c$ parameters determine when the material starts breaking (larger=chunky, smaller=powdery). The hardening coefficient determines how fast the material breaks once it is plastic (larger=brittle, smaller=ductile). For example, dry and powdery snow may be associated with smaller critical compression and stretch constants, while the opposite is true for wet and chunky snow. Icy snow may be modeled with a higher hardening coefficient and Young's modulus, with the opposite producing muddy snow.

Panel A shows the results of a simulation of a block of snow 210 breaking over a wedge 220 using the following parameter values: $E_0=4.8\times10^5$, $\theta_c=2.5\times10^{-2}$, $\theta_s=7.5\times10^{-3}$, $\xi=10$. Although snow is used in this example, other granular materials (e.g., sand, dust, etc.) may also be simulated in a similar manner. Panel B shows the same simulation with a lower hardening parameter: $\xi$: $E_0=4.8\times10^5$, $\theta_c=2.5\times10^{-2}$, $\theta_s=7.5\times10^{-3}$, $\xi=5$. As discussed, a larger hardening parameter causes the snow to be more brittle, whereas a smaller hardening parameter causes the snow to be more ductile. Panel C shows the same simulation with a lower Young's modulus and the following parameter values: $E_0=4.8\times10^5$, $\theta_c=2.5\times10^{-2}$, $\theta_s=7.5\times10^{-3}$, $\xi=10$. As discussed, a smaller Young's modulus tends to produce softer snow with less packing, whereas a higher Young's modulus may produce more packed or crusted snow. Panels D-F show the same simulation with lower critical compression, lower critical compression and stretch, and lower critical stretch, respectively. As discussed, the critical compression and stretch parameters determine when the snow starts breaking, with larger values causing the material to be chunkier and smaller values causing the material to be more powdery. In the panel D simulation, the following parameter values were used: $E_0=4.8\times10^5$, $\theta_c=1.9\times10^{-2}$, $\theta_s=7.5\times10^{-3}$, $\xi=10$. In the panel E simulation, the following parameter values were used: $E_0=4.8\times10^5$, $\theta_c=1.9\times10^{-2}$, $\theta_s=5.0\times10^{-3}$, $\xi=10$. In the panel F simulation, the following parameter values were used: $E_0=4.8\times10^5$, $\theta_c=2.5\times10^{-2}$, $\theta_s=5.0\times10^{-3}$, $\xi=10$.

Figure 3:
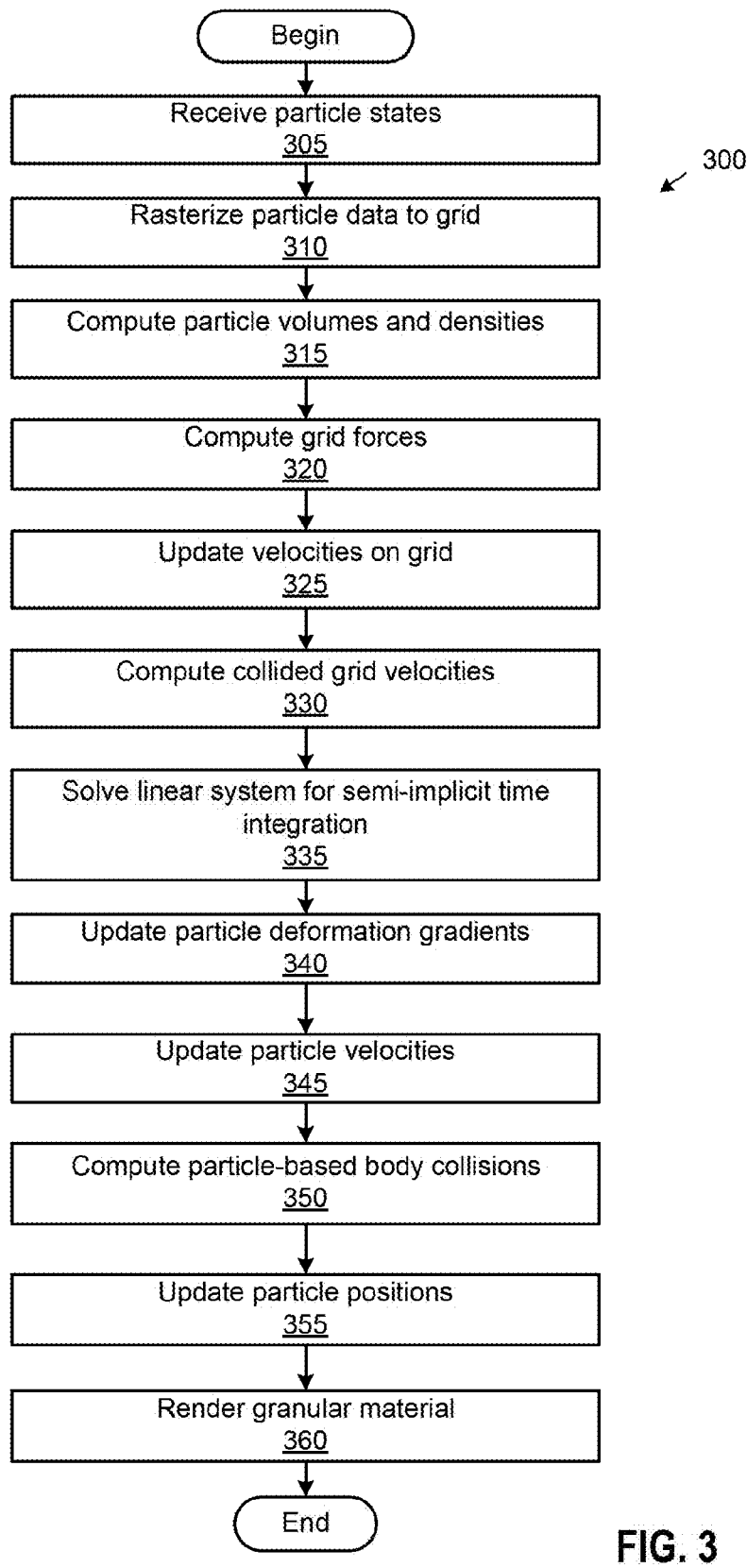
FIG. 3 illustrates a method for simulating snow using the material point method, according to an aspect of this disclosure.

FIG. 3 illustrates a method 300 for simulating snow using the material point method, according to an aspect of this disclosure. As shown, the method 300 begins at step 305, where the simulation application receives particle states. As discussed, each particle p of snow may have position $x_p$, velocity $v_p$, mass $m_p$, and deformation gradient $F_p$.

At step 310, the simulation application rasterizes the particle data to a grid. The grid may be a regular background Eulerian grid. In one configuration, the grid may be an adaptive sparse grid. Doing so may improve memory efficiency, as memory would be saved for uninfluenced nodes which do not need to be iterated over. Rasterizing the particle data to the grid may include transferring mass and velocities from the particles p to the grid. The simulation application may transfer mass using the weighting function $m_i^n = \Sigma_p m_p w_{ip}^n$. Velocity is also transferred, but weighting with $w_{ip}^n$ does not result in conserved momentum. In one configuration, the normalized weights $v_i^n = \Sigma_p v_p^n m_p w_{ip}^n / m_i^n$ may be used instead to transfer velocity to the grid.

At step 315, the simulation application computes particle volumes and densities. These computations may be performed only for a first timestep. The discretization of forces in the grid requires a notion of a particle's volume in the initial configuration. The simulation application may estimate a cell's density as $m_i^0/h^3$, which may be weighted back to the particle as $\rho_p^0 = \Sigma_i m_i^0 w_{ip}^0/h^3$. The simulation application may then estimate the particle's volume as $V_p^0 = m_p/\rho_p^0$.

At step 320, the simulation application computes grid forces using the constitutive model, discussed above with respect to FIG. 2. Total elastic potential energy can be expressed in terms of the energy density $\Psi$, defined above, as $$\int_{\Omega^0} \Psi(F_E(X), F_P(X)) dX \qquad (5)$$

where $\Omega^0$ is the undeformed configuration of the material. The MPM spatial discretization of the stress-based forces is equivalent to differentiation of a discrete approximation of this energy with respect to the Eulerian grid node material positions. However, the simulation application may not actually deform the Eulerian grid, so the change in grid node locations may be thought of as being determined by the grid node velocities. That is, if $x_i$ is the position of grid node i, then $\hat{x}_i = x_i + \Delta t v_i$ would be the deformed location of that grid given the current velocity $v_i$ of the node. Let the vector of all grid nodes $\hat{x}_i$ be $\hat{x}$. Then, the MPM approximation to the total elastic potential may be written as $$\Phi(\hat{x}) = \Sigma_p V_p^0 \Psi(\hat{F}_{Ep}(\hat{x}), F_{Pp}^n), \qquad (6)$$

where $V_p^0$ is the volume of material originally occupied by particle p, $F_{Pp}^n$ is the plastic part of F at particle p at time $t^n$ and $F_{Ep}$ is the elastic part which is related to $\hat{x}$ as $$\hat{F}_{Ep}(\hat{x}) = (I + \Sigma_i (\hat{x}_i - x_i)(\nabla w_{ip}^n)^T) F_{Ep}^n. \qquad (7)$$

With this convention, the MPM spatial discretization of the stress-based forces is given as:

$$-f_i(\hat{x}_i) = \frac{\partial \Phi}{\partial \hat{x}_i}(\hat{x}) = \sum_p V_p^0 \frac{\partial \Psi}{\partial F_E}(\hat{F}_{Ep}(\hat{x}), F_{Pp}^n)(F_{Ep}^n)^T \nabla w_{ip}^n. \qquad (8)$$

That is, $f_i(\hat{x}_i)$ is the force on grid node i resulting from elastic stresses. This may be written in terms of the Cauchy stress $$\sigma_p = \frac{1}{J_p^n} \frac{\partial \Psi}{\partial F_E}(\hat{F}_{Ep}(\hat{x}), F_{Pp}^n)(F_{Ep}^n)^T$$

as $$f_i(\hat{x}) = -\Sigma_p V_p^n \sigma_p \nabla w_{ip}^n, \qquad (9)$$

where $V_p^n = J_p^n V_p^0$ is the volume of the material occupied by particle p at time $t^n$. In one configuration, the simulation application may compute grid forces at step 315 using equation (9) with $\hat{x}_i = x_i$.

At step 325, the simulation application updates velocities on the grid. The simulation application may evolve grid velocities implicitly in time, and, in such a case, an implicit step may be taken on the elastic part of the update by utilizing the Hessian of the potential with respect to $\hat{x}$. The action of such a Hessian on an arbitrary increment $\delta u$ may be expressed as $$-\delta f_i = \sum_j \frac{\partial^2 \Phi}{\partial \hat{x}_i \partial \hat{x}_j}(\hat{x}) \delta u_j = \sum_p V_p^0 A_p (F_{Ep}^n)^T \nabla w_{ip}^n, \qquad (10)$$

where $$A_p = \frac{\partial^2 \Psi}{\partial F_E \partial F_E}(F_E(\hat{x}), F_{Pp}^n) : \left( \sum_j \delta u_j (\nabla w_{jp}^n)^T F_{Ep}^n \right), \qquad (11)$$

and the notation $A = C : D$ meaning that $A_{ij} = C_{ijkl} D_{kl}$ with the summation implied on indices kl.

In one configuration, the simulation application may update the velocities to $v_i^*$ using the equation $v_i^* = v_i^n + \Delta t m_i^{-1} f_i^n$, discussed in greater detail below. As the grid itself is not actually deformed such that grid node positions become $\hat{x}_i = x_i + \Delta t v_i$, $\hat{x} = \hat{x}(v)$ may be considered to be defined by v, and the following notations are used herein:

$$f_i^n = f_i(\hat{x}(0)), f_i^{n+1} = f_i(\hat{x}(v^{n+1})), \text{ and}$$

$$\frac{\partial^2 \Phi^n}{\partial \hat{x}_i \partial \hat{x}_j} = -\frac{\partial f_i^n}{\partial \hat{x}_j} = -\frac{\partial f_i^n}{\partial \hat{x}_j}(\hat{x}(0)).$$

At step 330, the simulation application computes collided grid velocities. That is, the simulation application modifies the grid velocities determined at step 325 in response to collisions between the grid and another body or bodies. In one configuration, the simulation application may process collisions against collision bodies twice at each time step. In such a case, the first time the collisions are processed may be on the grid velocities $v_i^*$ immediately after forces are applied to grid velocities. In the case of semi-implicit integration, discussed in greater detail below, this contributes to the right hand side of the linear system, and degrees of freedom corresponding to the colliding grid nodes are projected out during the solving of the linear system. The simulation application may apply collisions once more to particle velocities $v_p^{n+1}$ before updating positions to account for minor discrepancies between particle and grid velocities due to interpolation. In each case, collision processing is performed in the same manner, and collisions may be treated as inelastic, i.e., kinetic energy is lost as a result of the collision.

In one configuration, the collision objects may be represented as level sets, which makes collision detection ($\varphi \leq 0$) trivial. When a collision occurs, the simulation application may compute the local normal $n = \nabla \varphi$ and object velocity $v_{co}$. First, the simulation application may transform the particle/grid velocity v into the reference frame of the collision object, $v_{rel} = v - v_{co}$. If the bodies are separating ($v_n = v_{rel} \cdot n \geq 0$), then no collision is applied. Let $v_t = v_{rel} - n v_n$ be the tangential portion of the relative velocity. If a sticking impulse is required ($\|v_t\| \leq -\mu v_n$), then the simulation application may let $v_{rel}' = 0$, where the prime indicates that the collision has been applied. Otherwise, the simulation application may apply dynamic friction, and let $v_{rel}' = v_t + \mu v_n v_t / \|v_t\|$, where $\mu$ is the coefficient of friction. Then, the simulation application may transform the collided relative velocity back into world coordinates with $v' = v_{rel}' + v_{co}$.

In one configuration, two types of collision objects may be used: rigid and deforming. In the case of rigid objects, a stationary level set and a potentially time-varying rigid transformation may be stored, and the simulation application may use such a level set and transformation to compute $\varphi$, n, and $v_{co}$ at any point. In the case of deforming objects, the simulation application may load level set key frames and interpolate such frames using $\varphi(x, t + \gamma \Delta t) = (1 - \gamma) \varphi(x - \gamma \Delta t v_{co}, t) + \gamma \varphi(x + (1 - \gamma) \Delta t v_{co}, t + \Delta t)$, with the velocity being computed as $v_{co} = (1 - \gamma) v(x, t) + \gamma v(x, t + \Delta t)$ rather than using the average velocity.

In another configuration, the simulation application may use a sort of sticky collision in situations where a user wants the snow to stick to vertical or under-hanging surfaces. In such a case, Coulomb friction may be insufficient, since the normal relative velocity would be zero (vertical) or positive (under-hanging and separating due to gravity.). Instead, the sticky collision may be achieved by setting $v_{rel}' = 0$ unconditionally for collision against these surfaces.

At step 335, the simulation application solves a linear system for semi-implicit time integration. A system of equations on grid cells is used, rather than on individual particles of the snow, improving computational efficiency. In one configuration, the simulation application may perform semi-implicit integration by solving the following linear system for $v_i^{n+1}$:

$$\sum_j \left( I \delta_{ij} + \beta \Delta t^2 m_i^{-1} \frac{\partial \Phi^n}{\partial \hat{x}_i \partial \hat{x}_j} \right) v_j^{n+1} = v_i^*, \qquad (12)$$

where the right hand side is $$v_i^* = v_i^n + \Delta t m_i^{-1} f_i^n \qquad (13)$$

and $\beta$ chooses between explicit ($\beta = 0$), trapezoidal ($\beta = \frac{1}{2}$), and backward Euler ($\beta = 1$). As discussed, the following notations are used herein: $f_i^n = f_i(\hat{x}(0)), f_i^{n+1} = f_i(\hat{x}(v^{n+1}))$, and $$\frac{\partial^2 \Phi^n}{\partial \hat{x}_i \partial \hat{x}_j} = -\frac{\partial f_i^n}{\partial \hat{x}_j} = -\frac{\partial f_i^n}{\partial \hat{x}_j}(\hat{x}(0)),$$

where $f_i$ and $\Phi$ are as defined above. Given these derivatives, the implicit update may be formed using $$v_i^{n+1} =$$

$$v_i^n + \Delta t m_i^{-1}((1 - \beta) f_i^n + \beta f_i^{n+1}) \approx v_i^n + \Delta t m_i^{-1} \left( f_i^n + \beta \Delta t \sum_j \frac{\partial f_i^n}{\partial \hat{x}_i} v_j^{n+1} \right).$$

This leads to the (mass) symmetric system of equation (12) for solving for $v_i^{n+1}$.

At step 340, the simulation application updates the deformation gradients of the particles. The deformation gradient for each particle may be updated as $F_p^{n+1} = (I + \Delta t \nabla v_p^{n+1}) F_p^n$, where $\nabla v_p^{n+1}$ is computed as $\nabla v_p^{n+1} = \Sigma_i v_i^{n+1} (w_{ip}^n)^T$. In one configuration, the simulation application may begin by temporarily defining $\hat{F}_{Ep}^{n+1} = (I + \Delta t \nabla v_p^{n+1}) F_{Ep}^n$ as in equation (7) and $\hat{F}_{Pp}^{n+1} = F_{Pp}^n$, so that initially all the changes are attributed to the elastic part of the deformation gradient $$F_p^{n+1} = (I + \Delta t \nabla v_p^{n+1}) F_{Ep}^n F_{Pp}^n = \hat{F}_{Ep}^{n+1} \hat{F}_{Pp}^{n+1}. \qquad (14)$$

The simulation application may take the part of $\hat{F}_{Ep}^{n+1}$ that exceeds a critical deformation threshold and push this part into $\hat{F}_{Pp}^{n+1}$. The simulation application may then compute the singular value decomposition $\hat{F}_{Ep}^{n+1} = U_p \hat{\Sigma}_p V_p^T$ and clamp the singular values to the permitted range $\Sigma_p = \text{clamp}(\hat{\Sigma}_p, [1 - \theta_c, 1 + \theta_s])$. The elastic and plastic components of the deformation gradient may then be computed as $$F_{Ep}^{n+1} = U_p \Sigma_p V_p^T \text{ and } F_{Pp}^{n+1} = V_p \Sigma_p^{-1} U_p^T F_p^{n+1}. \qquad (15)$$

It can be easily verified that $F_p^{n+1} = F_{Ep}^{n+1} F_{Pp}^{n+1}$.

At step 345, the simulation application updates the particles' velocities. New particle velocities may be computed as $v_p^{n+1} = (1 - \alpha) v_{PICp}^{n+1} + \alpha v_{FLIPp}^{n+1}$, where $v_{PICp}^{n+1}$ is the PIC part $v_{PICp}^{n+1} = \Sigma_i v_i^{n+1} w_{ip}^n$, and $v_{FLIPp}^{n+1}$ is the FLIP part $v_{FLIPp}^{n+1} = v_p^n + \Sigma_i (v_i^{n+1} - v_i^n) w_{ip}^n$. The constant $\alpha$ may be chosen as, for example $\alpha = 0.95$.

At step 350, the simulation application computes particle-based body collisions. Such collisions may be computed on $v_p^{n+1}$ in a similar manner as the body collisions discussed above with respect to step 330 for the grid.

Then, at step 355, the simulation application updates particle positions. This update may be performed using simply $x_p^{n+1} = x_p^n + \Delta t \nabla v_p^{n+1}$.

At step 360, the simulation application renders the snow. Rendering may generally include generating one or more video frames depicting the snow. The discrete grid in the MPM procedure measures density relative to the material points, providing a way to show visual variation between snow that is loose and tightly packed. At render time, the simulation application may rasterize the final simulated material points to the simulation grid using the same kernels discussed above with respect to the MPM procedure. That is, the MPM procedure gives a volumetric grid which may be directly rendered with a volume renderer, with data for the volume rendering being obtained using the data representation from the MPM procedure. This is in contrast to traditional techniques for rendering snow, which typically rendered the surface of the snow. Alternatively, improved anti-aliasing may be obtained with better kernels or a completely different grid.

In one configuration, the simulation application may render the snow using a volumetric path tracer to solve the volume scattering equation using a Henyey-Greenstein phase function that approximates the Mie scatting theory of ice crystals. In a particular configuration, the simulation application may use a mean-cosine of g=0.5 to obtain forward scattering, and use an extinction coefficient $\sigma_t$=724 m$^{-1}$ and scattering albedo $$\frac{\sigma_s}{\sigma_t} = [0.9, 0.95, 1.0],$$

where $\sigma_s$ is the scattering coefficient.

Figure 4:
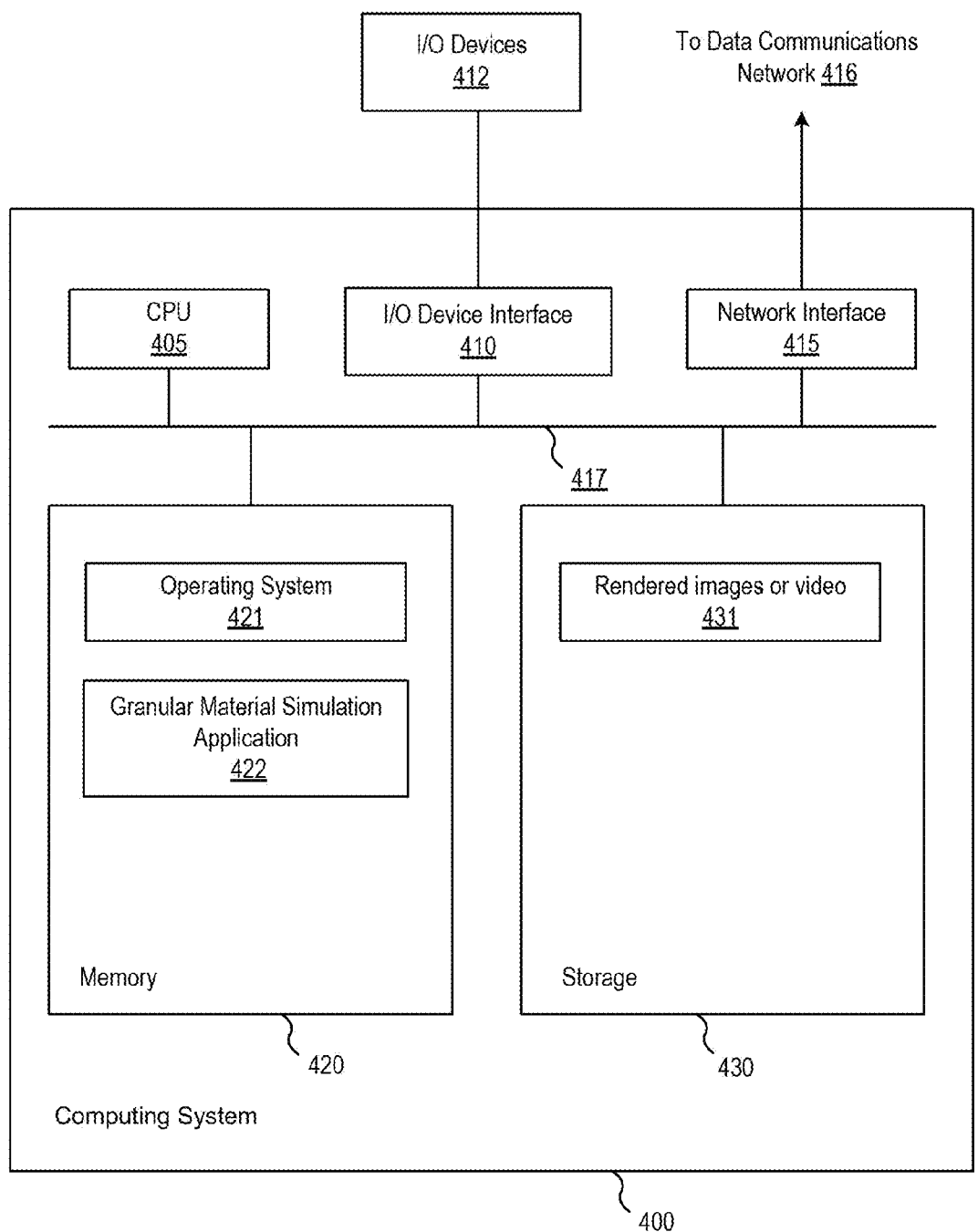
FIG. 4 illustrates a system in which an aspect of this disclosure may be implemented.

FIG. 4 illustrates a system 400 in which an aspect of this disclosure may be implemented. As shown, the system 400 includes, without limitation, a central processing unit (CPU) 405, a network interface 415 connecting the system to a network 416, an interconnect 417, a memory 420, and storage 430. The system 400 may also include an I/O device interface 410 connecting I/O devices 412 (e.g., keyboard, display and mouse devices) to the system 400.

The CPU 405 retrieves and executes programming instructions stored in the memory 420. Similarly, the CPU 405 stores and retrieves application data residing in the memory 420. The interconnect 417 facilitates transmission, such as of programming instructions and application data, between the CPU 405, I/O device interface 410, storage 430, network interface 415, and memory 420. CPU 405 is included to be representative of a single CPU, multiple CPUs, a single CPU having multiple processing cores, and the like. And the memory 420 is generally included to be representative of a random access memory. The storage 430 may be a disk drive storage device. Although shown as a single unit, the storage 430 may be a combination of fixed and/or removable storage devices, such as magnetic disk drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 420 includes an operating system 421 and a snow simulation application 422. Illustratively, the operating system 421 may include Linux®. The snow simulation application 422 is configured to simulate snow and render snow phenomena to one or more video frames. In one configuration, the snow simulation application 422 may use a constitutive model which includes user-controllable parameters for modeling dynamics of the snow, as discussed above with respect to FIG. 2, as well as the MPM procedure to simulate the snow, and render the simulated snow to images or video frames 431, as discussed above with respect to FIGS. 1 and 3. Doing so may provide a relatively realistic simulation and rendering of the snow compared to traditional techniques, which are unable to handle the continuum of material properties exhibited by snow.

Advantageously, techniques disclosed herein permit the efficient simulation and rendering of granular materials such as snow at a macroscopic scale using the MPM procedure. The elasto-plastic constitutive model for computing forces in the simulation may allow blending between elasticity and plasticity for more realistic simulation of the granular material. The parameters of the constitutive model may further be user-controllable such that the properties of the granular material may be adjusted as desired. As a result, techniques disclosed herein may be used to simulate, e.g., a wide variety of snow behaviors, including dense and wet snow. Particular parameters may include thresholds defined in terms of strain, which is more intuitive for users to control than stress. Experience has shown that a polar coordinate reparametrization which includes a plasticity threshold controlling how strong the granular material is, a chunkiness parameter controlling the size of chunks of the granular material, and a Poisson's ratio parameter, is particularly intuitive for users. Further, configurations disclosed herein use the MPM grid in volumetric rendering, such that individual particles do not need to be rendered.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for rendering a granular material, the method comprising:
    receiving states of particles of the granular material;
    rasterizing the states of the particles to a grid;
    computing, on the grid, forces dictated by an elasto-plastic constitutive model which factors into plastic strain and elastic strain using finite-strain multiplicative elasticity with the elasticity being hyperelastic, wherein:
        the elasto-plastic constitutive model is defined in terms of an elasto-plastic energy density function having form $$\Psi(F_E, F_P) = \mu(F_P)\|F_E - R_E\|_F^2 + \frac{\lambda(F_P)}{2}(J_E - 1)^2,$$

$F_E$ being an elastic part and $F_P$ being a plastic part of a deformation gradient F,
        $F_E$ is given by a fixed corotated energy density,
        Lamé parameters in the elasto-plastic constitutive model are functions of plastic deformation gradients $\mu(F_P)=\mu_0 e^{\xi(1-J_P)}$ and $\lambda(F_P)=\lambda_0 e^{\xi(1-J_P)}$, and $J_E=\det F_E$, $J_P=\det F_P$, $F_E=R_E S_E$ by a polar decomposition, $\lambda_0$ and $\mu_0$ are initial Lamé coefficients, and $\xi$ is a dimensionless plastic hardening parameter;
    updating velocities on the grid based, at least in part, on the forces dictated by the elasto-plastic constitutive model;
    updating the states of the particles based, at least in part, on the updated velocities on the grid; and
    rendering one or more images of the granular material based, at least in part, on a rasterization of the updated states of the particles to the grid.

2. The computer-implemented method of claim 1, wherein the grid and the particles are coupled using a material point method.

3. The computer-implemented method of claim 1, wherein, in the elasto-plastic constitutive model, one or more user-controllable parameters are used to define, in terms of stretch or deformation applied to the granular material, one or more thresholds to switch from elastic deformation to plastic deformation or fracture.

4. The computer-implemented method of claim 1, wherein:
    the plastic hardening parameter $\xi$ defines how fast the granular material breaks once the granular material becomes plastic; and
    the plastic hardening parameter $\xi$ is defined so that stiffness parameters are increased when the granular material is compressed by a force.

5. The computer-implemented method of claim 1, wherein the elasto-plastic constitutive model is controlled based, at least in part, on a polar coordinate parameterization.

6. The computer-implemented method of claim 5, wherein, in the elasto-plastic constitutive model, one or more user-controllable parameters in the polar coordinate parameterization are used to define at least one of a plasticity threshold which controls how much strength is required to break the granular material, chunk size of the granular material after breaking, and a Poisson's ratio.

7. The computer-implemented method of claim 1, wherein the rendering includes volume rendering the granular material using grid densities.

8. The computer-implemented method of claim 1, wherein the granular material is one of snow, sand, and dust.

9. A non-transitory computer-readable storage medium storing a program, which, when executed by a processor performs operations for rendering a granular material, the operations comprising:
    receiving states of particles of the granular material;
    rasterizing the states of the particles to a grid;
    computing, on the grid, forces dictated by an elasto-plastic constitutive model which factors into plastic strain and elastic strain using finite-strain multiplicative elasticity with the elasticity being hyperelastic, wherein:
        the elasto-plastic constitutive model is defined in terms of an elasto-plastic energy density function having form $$\Psi(F_E, F_P) = \mu(F_P)\|F_E - R_E\|_F^2 + \frac{\lambda(F_P)}{2}(J_E - 1)^2,$$

$F_E$ being an elastic part and $F_P$ being a plastic part of a deformation gradient F,
        $F_E$ is given by a fixed corotated energy density, Lamé parameters in the elasto-plastic constitutive model are functions of plastic deformation gradients $\mu(F_P)=\mu_0 e^{\xi(1-J_P)}$ and $\lambda(F_P)=\lambda_0 e^{\xi(1-J_P)}$, and
$J_E=\det F_E$, $J_p=\det F_p$, $F_E=R_E S_E$ by a polar decomposition, $\lambda_0$ and $\mu_0$ are initial Lamé coefficients, and $\xi$ is a dimensionless plastic hardening parameter;

updating velocities on the grid based, at least in part, on the forces dictated by the elasto-plastic constitutive model;

updating the states of the particles based, at least in part, on the updated velocities on the grid; and rendering one or more images of the granular material based, at least in part, on a rasterization of the updated states of the particles to the grid.

10. The computer-readable storage medium of claim 9, wherein the grid and the particles are coupled using a material point method.

11. The computer-readable storage medium of claim 9, wherein, in the elasto-plastic constitutive model, one or more user-controllable parameters are used to define, in terms of stretch or deformation applied to the granular material, one or more thresholds to switch from elastic deformation to plastic deformation or fracture.

12. The computer-readable storage medium of claim 9, wherein:
the plastic hardening parameter $\xi$ defines how fast the granular material breaks once the granular material becomes plastic; and
the plastic hardening parameter $\xi$ being is defined so that stiffness parameters are increased when the granular material is compressed by a force.

13. The computer-readable storage medium of claim 9, wherein the elasto-plastic constitutive model is controlled based, at least in part, on a polar coordinate parameterization.

14. The computer-readable storage medium of claim 13, wherein, in the elasto-plastic constitutive model, one or more user-controllable parameters in the polar coordinate parameterization are used to define at least one of a plasticity threshold which controls how much strength is required to break the granular material, chunk size of the granular material after breaking, and a Poisson's ratio.

15. The computer-readable storage medium of claim 9, wherein the rendering includes volume rendering the granular material using grid densities.

16. The computer-readable storage medium of claim 9, wherein the granular material is one of snow, sand, and dust.

17. A system, comprising:
a processor; and
a memory, wherein the memory includes an application program configured to perform operations for rendering a granular material, the operations comprising:
receiving states of particles of the granular material,
rasterizing the states of the particles to a grid,
computing, on the grid, forces dictated by an elasto-plastic constitutive model which factors into plastic strain and elastic strain using finite-strain multiplicative elasticity with the elasticity being hyperelastic, wherein:
the elasto-plastic constitutive model is defined in terms of an elasto-plastic energy density function having form $$\Psi(F_E, F_P) = \mu(F_P)\|F_E - R_E\|_F^2 + \frac{\lambda(F_P)}{2}(J_E - 1)^2,$$

$F_E$ being an elastic part and $F_P$ being a plastic part of a deformation gradient F,
$F_E$ is given by a fixed corotated energy density,
Lamé parameters in the elasto-plastic constitutive model are functions of plastic deformation gradients $\mu(F_P)=\mu_0 e^{\xi(1-J_P)}$ and $\lambda(F_P)=\lambda_0 e^{\xi(1-J_P)}$, and
$J_E=\det F_E$, $J_p=\det F_p$, $F_E=R_E S_E$ by a polar decomposition, $\mu_0$ and $\mu_0$ are initial Lamé coefficients, and $\xi$ is a dimensionless plastic hardening parameter;
updating velocities on the grid based, at least in part, on the forces dictated by the elasto-plastic constitutive model,
updating the states of the particles based, at least in part, on the updated velocities on the grid, and
rendering one or more images of the granular material based, at least in part, on a rasterization of the updated states of the particles to the grid.

18. The system of claim 17, wherein the grid and the particles are coupled using a material point method.

* * * * *

UNITED STATES PATENT AND TRADEMARK OFFICE
CERTIFICATE OF CORRECTION

PATENT NO. : 10,019,827 B2
APPLICATION NO. : 14/257044
DATED : July 10, 2018
INVENTOR(S) : Andrew Selle et al.

It is certified that error appears in the above-identified patent and that said Letters Patent is hereby corrected as shown below:

On the Title Page

On the page 2, in Column 1, item (56) under "Other Publications", Line 29, delete "SIGGRPH" and insert -- SIGGRAPH --, therefor.

On the page 2, in Column 2, item (56) under "Other Publications", Line 26, delete "SIGGRPH" and insert -- SIGGRAPH --, therefor.

In the Specification

In Column 4, Line 6, delete "x=φ(X)" and insert -- $x=\varphi(X)$ --, therefor.

In Column 4, Line 7, delete "X" and insert -- $X$ --, therefor.

In Column 4, Line 7, delete "x," and insert -- $x,$ --, therefor.

In Column 4, Line 8, delete "F=∂φ/∂X." and insert -- $F=\partial\varphi/\partial X.$ --, therefor.

In Column 4, Line 8, delete "φ(X)" and insert -- $\varphi(X)$ --, therefor.

In Column 4, Line 15, delete " $\sigma = \frac{1}{J}\frac{\partial \Psi}{\partial F_E}F_E^T,$ " and insert -- $\boldsymbol{\sigma} = \frac{1}{J}\frac{\partial \Psi}{\partial F_E}\boldsymbol{F}_E^T,$ --, therefor.

In Column 4, Line 17, delete "ρ" and insert -- $\rho$ --, therefor.

In Column 4, Line 17, delete "t" and insert -- $t$ --, therefor.

Signed and Sealed this
Thirteenth Day of August, 2019

Andrei Iancu
*Director of the United States Patent and Trademark Office*

CERTIFICATE OF CORRECTION (continued)
U.S. Pat. No. 10,019,827 B2

In Column 4, Line 17, delete "v" and insert -- $v$ --, therefor.

In Column 4, Line 17, delete "σ" and insert -- $\sigma$ --, therefor.

In Column 4, Line 18, delete "Ψ" and insert -- $\Psi$ --, therefor.

In Column 4, Line 18, delete "F$_E$" and insert -- $F_E$ --, therefor.

In Column 4, Line 19, delete "F" and insert -- $F$ --, therefor.

In Column 4, Line 19, delete "j=det(F)." and insert -- $j=det(F)$. --, therefor.

In Column 4, Line 30, delete "p" and insert -- $p$ --, therefor.

In Column 4, Line 30, delete "x$_p$," and insert -- $x_p$, --, therefor.

In Column 4, Line 30, delete "v$_p$," and insert -- $v_p$, --, therefor.

In Column 4, Line 30, delete "m$_p$," and insert -- $m_p$, --, therefor.

In Column 4, Line 31, delete "F$_p$." and insert -- $F_p$. --, therefor.

In Column 4, Line 33, delete "Dρ/Dt and ρDv/Dt," and insert -- $\frac{D\rho}{Dt}$ and $\rho\frac{Dv}{Dt}$, --, therefor.

In Column 4, Line 50, delete "i=(i,j,k)" and insert -- $i=(i,j,k)$ --, therefor.

In Column 4, Line 50, delete "x$_p$=(x$_p$,y$_p$,z$_p$)" and insert -- $x_p=(x_p,y_p,z_p)$ --, therefor.

In Column 4, Line 60, delete " $w_{ip}=N_i^h(x_p)$ " and insert -- $w_{ip}=N_i^h(x_p)$ --, therefor.

In Column 4, Lines 60-61, delete " $\nabla w_{ip}=\nabla N_i^h(x_p)$ " and insert -- $\nabla w_{ip}=\nabla N_i^h(x_p)$ --, therefor.

In Column 5, Line 3, delete "w$_{ip}$." and insert -- $w_{ip}$. --, therefor.

In Column 5, Line 54, delete "F" and insert -- $F$ --, therefor.

In Column 5, Line 54, delete "F$_E$" and insert -- $F_E$ --, therefor.

In Column 5, Line 55, delete "F$_P$" and insert -- $F_P$ --, therefor.

In Column 5, Line 55, delete "F=F$_E$F$_P$." and insert -- $F=F_E F_P$. --, therefor.

CERTIFICATE OF CORRECTION (continued)
U.S. Pat. No. 10,019,827 B2

In Column 5, Line 67, delete "$\mu(F_P)=\mu_0 e^{\xi(1-jP)}$ and $\lambda(F_P)=\lambda_0 e^{\xi(1-jP)}$" and insert -- $\mu(F_P) = \mu_0 e^{\xi(1-J_P)}$ and $\lambda(F_P) = \lambda_0 e^{\xi(1-J_P)}$, --, therefor.

In Column 6, Line 1, delete "$J_E$=det $F_E$, $J_P$=det $F_P$, $F_E$=$R_E S_E$" and insert -- $J_E = \det F_E$, $J_P = \det F_P$, $F_E = R_E S_E$ --, therefor.

In Column 6, Line 2, delete "$\lambda_0$ and $\mu_0$" and insert -- $\lambda_0$ and $\mu_0$ --, therefor.

In Column 6, Line 2, delete "$\xi$" and insert -- $\xi$ --, therefor.

In Column 6, Line 3, delete "$\xi$" and insert -- $\xi$ --, therefor.

In Column 6, Line 16, delete "$\theta_c$" and insert -- $\theta_c$ --, therefor.

In Column 6, Line 16, delete "$\theta_s$" and insert -- $\theta_s$ --, therefor.

In Column 6, Line 18, delete "$F_E$" and insert -- $F_E$ --, therefor.

In Column 6, Line 19, delete "[1−$\theta_c$, 1+$\theta_s$]." and insert -- [1−$\theta_c$, 1+$\theta_s$]. --, therefor.

In Column 6, Line 20, delete "$\rho_0$," and insert -- $\rho_0$, --, therefor.

In Column 6, Line 21, delete "$E_0$" and insert -- $E_0$ --, therefor.

In Column 6, Line 24, delete "$\theta_c$" and insert -- $\theta_c$ --, therefor.

In Column 6, Line 25, delete "$\theta_s$" and insert -- $\theta_s$ --, therefor.

In Column 6, Line 27, delete "$\theta_c$" and insert -- $\theta_c$ --, therefor.

In Column 6, Line 28, delete "$\theta_s$" and insert -- $\theta_s$ --, therefor.

In Column 6, Line 32, delete "$\theta_c$" and insert -- $\theta_c$ --, therefor.

In Column 6, Line 32, delete "$\theta_s$" and insert -- $\theta_s$ --, therefor.

In Column 6, Line 43, delete "r" and insert -- $r$ --, therefor.

In Column 6, Line 44, delete "α" and insert -- $\alpha$ --, therefor.

In Column 6, Line 46, delete "v" and insert -- $v$ --, therefor.

In Column 6, Line 48, delete "$\theta_c$" and insert -- $\theta_c$ --, therefor.

CERTIFICATE OF CORRECTION (continued)
U.S. Pat. No. 10,019,827 B2

In Column 6, Line 48, delete "θ$_s$" and insert -- $\theta_s$ --, therefor.

In Column 6, Line 56, delete "F$_E$" and insert -- $F_E$ --, therefor.

In Column 6, Line 57, delete "θ$_s$" and insert -- $\theta_s$ --, therefor.

In Column 6, Line 58, delete "θ$_c$" and insert -- $\theta_c$ --, therefor.

In Column 6, Line 65, delete "θ$_s$" and insert -- $\theta_s$ --, therefor.

In Column 6, Line 66, delete "θ$_c$" and insert -- $\theta_c$ --, therefor.

In Column 7, Lines 10-11, delete "$E_0=4.8\times10^5, \theta_c=2.5\times10^{-2}, \theta_s=7.5\times10^{-3}, \xi=10.$" and insert -- $E_0=4.8\times10^5, \theta_c=2.5\times10^{-2}, \theta_s=7.5\times10^{-3}, \xi=10.$ --, therefor.

In Column 7, Lines 15-16, delete "$\xi: E_0=4.8\times10^5, \theta_c=2.5\times10^{-2}, \theta_s=7.5\times10^{-3}, \xi=5.$" and insert -- $\xi: E_0=4.8\times10^5, \theta_c=2.5\times10^{-2}, \theta_s=7.5\times10^{-3}, \xi=5.$ --, therefor.

In Column 7, Lines 20-21, delete "$E_0=4.8\times10^5, \theta_c=2.5\times10^{-2}, \theta_s=7.5\times10^{-3}, \xi=10.$" and insert -- $E_0=4.8\times10^5, \theta_c=2.5\times10^{-2}, \theta_s=7.5\times10^{-3}, \xi=10.$ --, therefor.

In Column 7, Line 32, delete "$E_0=4.8\times10^5, \theta_c=1.9\times10^{-2}, \theta_s=7.5\times10^{-3}, \xi=10.$" and insert -- $E_0=4.8\times10^5, \theta_c=1.9\times10^{-2}, \theta_s=7.5\times10^{-3}, \xi=10.$ --, therefor.

In Column 7, Line 34, delete "$E_0=4.8\times10^5, \theta_c=1.9\times10^{-2}, \theta_s=5.0\times10^{-3}, \xi=10.$" and insert -- $E_0=4.8\times10^5, \theta_c=1.9\times10^{-2}, \theta_s=5.0\times10^{-3}, \xi=10.$ --, therefor.

In Column 7, Line 36, delete "$E_0=4.8\times10^5, \theta_c=2.5\times10^{-2}, \theta_s=5.0\times10^{-3}, \xi=10.$" and insert -- $E_0=4.8\times10^5, \theta_c=2.5\times10^{-2}, \theta_s=5.0\times10^{-3}, \xi=10.$ --, therefor.

In Column 7, Line 42, delete "p" and insert -- $p$ --, therefor.

In Column 7, Line 42, delete "x$_p$," and insert -- $x_p$, --, therefor.

In Column 7, Line 43, delete "v$_p$," and insert -- $v_p$, --, therefor.

In Column 7, Line 43, delete "m$_p$," and insert -- $m_p$, --, therefor.

In Column 7, Line 43, delete "F$_p$." and insert -- $F_p$. --, therefor.

In Column 7, Line 51, delete "p" and insert -- $p$ --, therefor.

CERTIFICATE OF CORRECTION (continued)
U.S. Pat. No. 10,019,827 B2

In Column 7, Line 53, delete "$m_i^n = \Sigma_p m_p w_{ip}^n$." and insert -- $m_i^n = \Sigma_p m_p w_{ip}^n$. --, therefor.

In Column 7, Line 54, delete "$w_{ip}^n$" and insert -- $w_{ip}^n$ --, therefor.

In Column 7, Line 55, delete "$v_i^n = \Sigma_p v_p^n m_p w_{ip}^n / m_i^n$," and insert -- $v_i^n = \Sigma_p v_p^n m_p w_{ip}^n / m_i^n$ --, therefor.

In Column 7, Line 62, delete "$m_i^0/h^3$," and insert -- $m_i^0/h^3$, --, therefor.

In Column 7, Line 63, delete "$\rho_p^0 = \Sigma_i m_i^0 w_{ip}^0 / h^3$." and insert -- $\rho_p^0 = \Sigma_i m_i^0 w_{ip}^0 / h^3$. --, therefor.

In Column 7, Line 64, delete "$V_p^0 = m_p/\rho_p^0$." and insert -- $V_p^0 = m_p/\rho_p^0$. --, therefor.

In Column 8, Line 11, delete "$x_i$" and insert -- $x_i$ --, therefor.

In Column 8, Line 11, delete "i" and insert -- $i$ --, therefor.

In Column 8, Line 12, delete "$\hat{x}_i = x_i + \Delta t v_i$" and insert -- $\hat{x}_i = x_i + \Delta t v_i$ --, therefor.

In Column 8, Line 13, delete "$v_i$" and insert -- $v_i$ --, therefor.

In Column 8, Line 14, delete "$\hat{x}_i$ be $\hat{x}$." and insert -- $\hat{x}_i$ be $\hat{x}$. --, therefor.

In Column 8, Line 18, delete "$V_p^0$" and insert -- $V_p^0$ --, therefor.

In Column 8, Line 19, delete "p, $F_{Pp}^n$" and insert -- $p$, $F_{Pp}^n$ --, therefor.

In Column 8, Line 19, delete "F" and insert -- $F$ --, therefor.

In Column 8, Line 19, delete "p" and insert -- $p$ --, therefor.

In Column 8, Line 19, delete "$t^n$" and insert -- $t^n$ --, therefor.

In Column 8, Line 20, delete "$F_{Ep}$" and insert -- $F_{Ep}$ --, therefor.

In Column 8, Line 20, delete "$\hat{x}$" and insert -- $\hat{x}$ --, therefor.

In Column 8, Line 26, delete "$-f_i(\hat{x}_i) = \frac{\partial \Phi}{\partial \hat{x}_i}(\hat{x}) = \sum_p V_p^0 \frac{\partial \Psi}{\partial F_E}(\hat{F}_{Ep}(\hat{x}), F_{Pp}^n)(F_{Ep}^n)^T \nabla w_{ip}^n.$" and insert -- $-f_i(\hat{x}_i) = \frac{\partial \Phi}{\partial \hat{x}_i}(\hat{x}) = \sum_p V_p^0 \frac{\partial \Psi}{\partial F_E}(\hat{F}_{Ep}(\hat{x}), F_{Pp}^n)(F_{Ep}^n)^T \nabla w_{ip}^n.$ --, therefor.

In Column 8, Line 30, delete "$f_i(\hat{x}_i)$" and insert -- $f_i(\hat{x}_i)$ --, therefor.

CERTIFICATE OF CORRECTION (continued)
U.S. Pat. No. 10,019,827 B2

In Column 8, Line 40, delete "$V_p^n = J_p^n V_p^0$" and insert -- $V_p^n = J_p^n V_p^0$ --, therefor.

In Column 8, Line 41, delete "p" and insert -- $p$ --, therefor.

In Column 8, Line 41, delete "$t^n$" and insert -- $t^n$ --, therefor.

In Column 8, Line 44, delete "$\hat{x}_i = x_i$" and insert -- $\hat{x}_i - x_i$ --, therefor.

In Column 8, Line 48, delete "$\hat{x}$" and insert -- $\hat{x}$ --, therefor.

In Column 8, Line 49, delete "δu" and insert -- $\delta u$ --, therefor.

In Column 8, Line 62, delete "A=C:D" and insert -- $A = C:D$ --, therefor.

In Column 8, Line 62, delete "$A_{ij} = C_{ijkl} D_{kl}$" and insert -- $A_{ij} = C_{ijkl} D_{kl}$ --, therefor.

In Column 8, Line 63, delete "kl." and insert -- $kl$. --, therefor.

In Column 8, Line 65, delete "$v_i*$" and insert -- $v_i*$ --, therefor.

In Column 8, Lines 65-66, delete "$v_i* = v_i^n + \Delta t m_i^{-1} f_i^n$," and insert -- $v_i* = v_i^n + \Delta t m_i^{-1} f_i^n$, --, therefor.

In Column 9, Line 1, delete "$\hat{x}_i = x_i + \Delta t v_i, \hat{x} = \hat{x}(v)$" and insert -- $\hat{x}_i = x_i + \Delta t v_i, \hat{x} = \hat{x}(v)$ --, therefor.

In Column 9, Line 2, delete "v," and insert -- $v$, --, therefor.

In Column 9, Line 18, delete "$v_i*$" and insert -- $v_i*$ --, therefor.

In Column 9, Line 25, delete "$v_p^{n+1}$" and insert -- $v_p^{n+1}$ --, therefor.

In Column 9, Line 32, delete "(φ≤0)" and insert -- $(\varphi \leq 0)$ --, therefor.

In Column 9, Line 34, delete "n=∇φ" and insert -- $n = \nabla\varphi$ --, therefor.

In Column 9, Line 34, delete "$v_{co}$." and insert -- $v_{co}$. --, therefor.

In Column 9, Line 36, delete "v" and insert -- $v$ --, therefor.

In Column 9, Line 37, delete "$v_{rel} = v - v_{co}$." and insert -- $v_{rel} = v - v_{co}$. --, therefor.

In Column 9, Line 37, delete "($v_n = v_{rel} \cdot n \geq 0$)," and insert -- $(v_n = v_{rel} \cdot n \geq 0)$, --, therefor.

In Column 9, Line 38, delete "$v_t = v_{rel} - n v_n$" and insert -- $v_t = v_{rel} - n v_n$ --, therefor.

In Column 9, Line 40, delete "$(\|v_t\| \leq -\mu v_n)$," and insert -- $(\|v_t\| \leq -\mu v_n)$, --, therefor.

CERTIFICATE OF CORRECTION (continued)
U.S. Pat. No. 10,019,827 B2

In Column 9, Line 41, delete "$v_{rel}'=0$," and insert -- $v_{rel}'=0$, --, therefor.

In Column 9, Line 43, delete "$v_{rel}'=v_t+\mu v_n v_t/\|v_t\|$," and insert -- $v_{rel}'=v_t+\mu v_n v_t/\|v_t\|$, --, therefor.

In Column 9, Line 43, delete "u" and insert -- $\mu$ --, therefor.

In Column 9, Line 46, delete "$v'=v_{rel}'+v_{co}$." and insert -- $v'=v_{rel}'+v_{co}$. --, therefor.

In Column 9, Lines 54-55, delete "$\varphi(x,t+\gamma\Delta t)=(1-\gamma)\varphi(x-\gamma\Delta t v_{co},t)+\gamma\varphi(x+(1-\gamma)\Delta t v_{co},t+\Delta t)$," and insert -- $\varphi(x,t+\gamma\Delta t)=(1-\gamma)\varphi(x-\gamma\Delta t v_{co},t)+\gamma\varphi(x+(1-\gamma)\Delta t v_{co},t+\Delta t)$,--, therefor.

In Column 9, Line 56, delete "$v_{co}=(1-\gamma)v(x,t)+\gamma v(x,t+\Delta t)$," and insert -- $\boldsymbol{v_{co} = (1-\gamma)v(x,t) + \gamma v(x, t+\Delta t)}$ --, therefor.

In Column 9, Line 64, delete "$v_{rel}'=0$" and insert -- $v_{rel}' = 0$ --, therefor.

In Column 10, Line 5, delete "$v_i^{n+1}$:" and insert -- $v_i^{n+1}$: --, therefor.

In Column 10, Line 15, delete "β" and insert -- $\beta$ --, therefor.

In Column 10, Line 15, delete "(β=0)," and insert -- $(\beta=0)$, --, therefor.

In Column 10, Line 15, delete "(β=½)," and insert -- $(\beta=½)$, --, therefor.

In Column 10, Line 16, delete "(β=1)" and insert -- $(\beta=1)$ --, therefor.

In Column 10, Line 17, delete "$f_i^n=f_i(\hat{x}(0), f_i^{n+1}=f_i(\hat{x}(v^{n+1})),$" and insert -- $\boldsymbol{f_i^n = f_i(\hat{x}(0), f_i^{n+1} = f_i(\hat{x}(v^{n+1})),}$ --, therefor.

In Column 10, Line 24, delete "f$_i$" and insert -- $f_i$ --, therefor.

In Column 10, Line 35, delete "$v_i^{n+1}$." and insert -- $v_i^{n+1}$. --, therefor.

In Column 10, Line 38, delete "$F_p^{n+1}=(I+\Delta t \nabla v_p^{n+1})F_p^n$," and insert -- $F_p^{n+1}=(I+\Delta t \nabla v_p^{n+1})F_p^n$, --, therefor.

In Column 10, Line 39, delete "$\nabla v_p^{n+1}$" and insert -- $\boldsymbol{\nabla v_p^{n+1}}$ --, therefor.

CERTIFICATE OF CORRECTION (continued)
U.S. Pat. No. 10,019,827 B2

In Column 10, Line 39, delete "$\nabla v_p^{n+1} = \Sigma_i v_i^{n+1}(w_{ip}^n)^T$." and insert --$\nabla v_p^{n+1} = \sum_i v_i^{n+1} (w_{ip}^n)^T$.--, therefor.

In Column 10, Line 41, delete "$\hat{F}_{Ep}^{n+1} = (I + \Delta t \nabla v_p^{n+1}) F_{Ep}^n$" insert --$\widehat{F}_{Ep}^{n+1} = (I + \Delta t \nabla v_p^{n+1}) F_{Ep}^n$--, therefor.

In Column 10, Line 42, delete "$\hat{F}_{Pp}^{n+1} = F_{Pp}^n$," and insert --$\widehat{F}_{Pp}^{n+1} = F_{Pp}^n$,--, therefor.

In Column 10, Line 45, delete "$\hat{F}_{Ep}^{n+1}$" and insert --$\widehat{F}_{Ep}^{n+1}$--, therefor.

In Column 10, Line 47, delete "$\hat{F}_{Pp}^{n+1}$." and insert --$\widehat{F}_{Pp}^{n+1}$.--, therefor.

In Column 10, Line 48, delete "$\hat{F}_{Ep}^{n+1} = U_p \hat{\Sigma}_p V_p^T$" and insert --$\widehat{F}_{Ep}^{n+1} = U_p \widehat{\Sigma}_p V_p^T$--, therefor.

In Column 10, Line 50, delete "$(\hat{\Sigma}_p, [1-\theta_c, 1+\theta_s])$." and insert --$(\widehat{\Sigma}_p, [1-\theta_c, 1+\theta_s])$.--, therefor.

In Column 10, Line 54, delete "$F_p^{n+1} = F_{Ep}^{n+1} F_{Pp}^{n+1}$." and insert --$F_p^{n+1} = F_{Ep}^{n+1} F_{Pp}^{n+1}$.--, therefor.

In Column 10, Lines 57-59, delete as "$v_p^{n+1} = (1-\alpha)v_{PICp}^{n+1} + \alpha v_{FLIPp}^{n+1}$, where $v_{PICp}^{n+1}$ is the PIC part $v_{PICp}^{n+1} = \Sigma_i v_i^{n+1} w_{ip}^n$, and $v_{FLIPp}^{n+1}$ is the FLIP part $v_{FLIPp}^{n+1} = v_p^n + \Sigma_i (v_i^{n+1} - v_i^n) w_{ip}^n$. The constant $\alpha$ may be"

and insert

-- as $v_p^{n+1} = (1-\alpha)v_{\text{PIC}p}^{n+1} + \alpha v_{\text{FLIP}p}^{n+1}$, where $v_{\text{PIC}p}^{n+1}$ is the PIC part $v_{\text{PIC}p}^{n+1} = \sum_i v_i^{n+1} w_{ip}^n$, and $v_{\text{FLIP}p}^{n+1}$ is the FLIP part $v_{\text{FLIP}p}^{n+1} = v_p^n + \sum_i (v_i^{n+1} - v_i^n) w_{ip}^n$. The constant $\alpha$ may be --, therefor.

In Column 10, Line 60, delete "α=0.95." and insert -- $\alpha = 0.95$. --, therefor.

In Column 10, Line 63, delete "v$_p^{n+1}$" and insert -- $v_p^{n+1}$ --, therefor.

In Column 10, Line 67, delete "x$_p^{n+1}$=x$_p^n$+Δt∇v$_p^{n+1}$." and insert -- $x_p^{n+1} = x_p^n + \Delta t \nabla v_p^{n+1}$ --, therefor.

In the Claims

In Column 13, Line 62, in Claim 1, delete "F$_E$" and insert -- $F_E$ --, therefor.

In Column 13, Line 62, in Claim 1, delete "F$_P$" and insert -- $F_P$ --, therefor.

In Column 13, Line 63, in Claim 1, delete "F," and insert -- $F$, --, therefor.

In Column 13, Line 64, in Claim 1, delete "F$_E$" and insert -- $F_E$ --, therefor.

In Column 13, Line 67, in Claim 1, delete "$\mu(F_P)=\mu_0 e^{\xi(1-J_P)}$ and $\lambda(F_P)=\lambda_0 e^{\xi(1-J_P)}$," and insert -- $\mu(F_P)=\mu_0 e^{\xi(1-J_P)}$ and $\lambda(F_P)=\lambda_0 e^{\xi(1-J_P)}$, --, therefor.

In Column 14, Line 1, in Claim 1, delete "J$_E$=detF$_E$, J$_p$=detF$_P$, F$_E$=R$_E$S$_E$" and insert -- $J_E$=det$F_E$, $J_P$=det$F_P$, $F_E$=$R_E S_E$ --, therefor.

In Column 14, Line 1, in Claim 1, delete "λ$_o$ and μ$_o$" and insert -- $\lambda_0$ and $\mu_0$ --, therefor.

In Column 14, Line 2, in Claim 1, delete "ξ" and insert -- $\xi$ --, therefor.

In Column 14, Line 24, in Claim 4, delete "ξ" and insert -- $\xi$ --, therefor.

In Column 14, Line 27, in Claim 4, delete "ξ" and insert -- $\xi$ --, therefor.

In Column 14, Line 65, in Claim 9, delete "F$_E$" and insert -- $F_E$ --, therefor.

In Column 14, Line 65, in Claim 9, delete "F$_P$" and insert -- $F_P$ --, therefor.

In Column 14, Line 66, in Claim 9, delete "F," and insert -- $F$, --, therefor.

In Column 14, Line 67, in Claim 9, delete "F$_E$" and insert -- $F_E$ --, therefor.

CERTIFICATE OF CORRECTION (continued)
U.S. Pat. No. 10,019,827 B2

In Column 15, Line 3, in Claim 9, delete "$\mu(F_P)=\mu_0 e^{\xi(1-J_P)}$ and $\lambda(F_P)=\lambda_0 e^{\xi(1-J_P)}$," and insert -- $\mu(F_P)=\mu_0 e^{\xi(1-J_P)}$ and $\lambda(F_P)=\lambda_0 e^{\xi(1-J_P)}$, --, therefor.

In Column 15, Line 4, in Claim 9, "$J_E=\det F_E, J_p=\det F_P, F_E=R_E S_E$" and insert -- $J_E=\det F_E, J_p=\det F_P, F_E=R_E S_E$ --, therefor.

In Column 15, Line 5, in Claim 9, delete "$\lambda_o$ and $\mu_o$" and insert -- $\lambda_0$ and $\mu_0$ --, therefor.

In Column 15, Line 5, in Claim 9, delete "ξ" and insert -- $\xi$ --, therefor.

In Column 15, Line 27, in Claim 12, delete "ξ" and insert -- $\xi$ --, therefor.

In Column 15, Line 30, in Claim 12, delete "ξ" and insert -- $\xi$ --, therefor.

In Column 15, Line 30, in Claim 12, before "is" delete "being".

In Column 16, Line 25, in Claim 17, delete "F$_E$" and insert -- $F_E$ --, therefor.

In Column 16, Line 25, in Claim 17, delete "F$_P$" and insert -- $F_P$ --, therefor.

In Column 16, Line 26, in Claim 17, delete "F," and insert -- $F$, --, therefor.

In Column 16, Line 27, in Claim 17, delete "F$_E$" and insert -- $F_E$ --, therefor.

In Column 16, Line 30, in Claim 17, delete "$\mu(F_P)=\mu_0 e^{\xi(1-J_P)}$ and $\lambda(F_P)=\lambda_0 e^{\xi(1-J_P)}$," and insert -- $\mu(F_P)=\mu_0 e^{\xi(1-J_P)}$ and $\lambda(F_P)=\lambda_0 e^{\xi(1-J_P)}$, --, therefor.

In Column 16, Line 31, in Claim 17, "$J_E=\det F_E, J_p=\det F_P, F_E=R_E S_E$" and insert -- $J_E=\det F_E, J_p=\det F_P, F_E=R_E S_E$ --, therefor.

In Column 16, Line 32, in Claim 17, delete "$\mu_0$ and $\mu_o$" and insert -- $\lambda_0$ and $\mu_0$ --, therefor.

In Column 16, Line 33, in Claim 17, delete "ξ" and insert -- $\xi$ --, therefor.